April 2, 1957 L. T. JOHNSON 2,787,066
HYDRAULICALLY OPERATED LAND LEVELER
Filed April 5, 1954 2 Sheets-Sheet 1
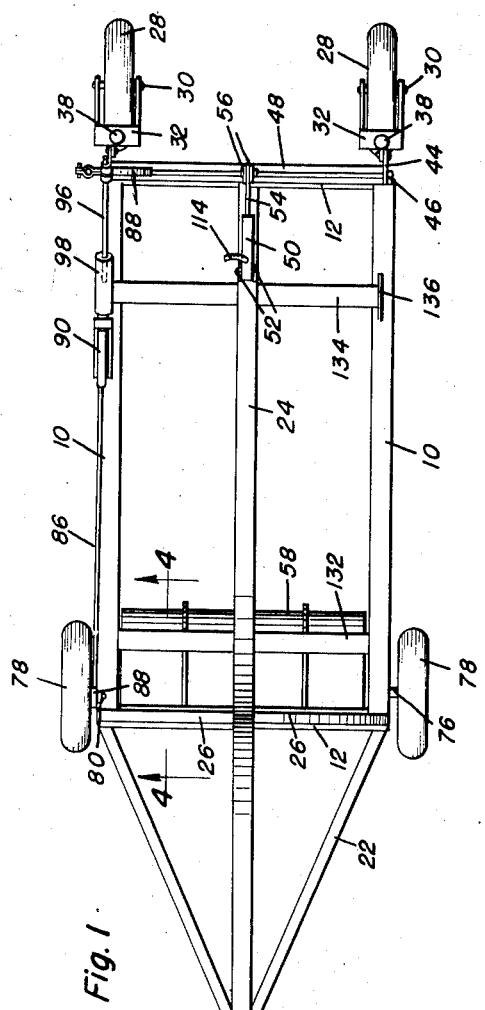
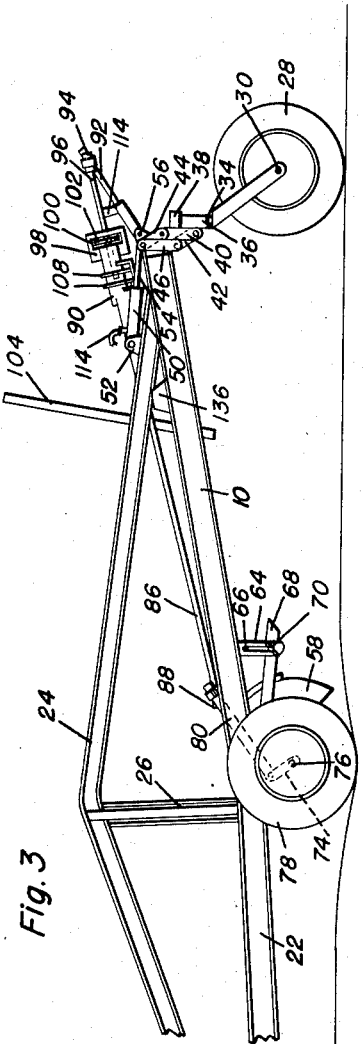
Lloyd T. Johnson
INVENTOR.
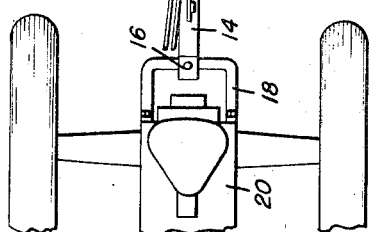

April 2, 1957 L. T. JOHNSON 2,787,066
HYDRAULICALLY OPERATED LAND LEVELER
Filed April 5, 1954 2 Sheets-Sheet 2
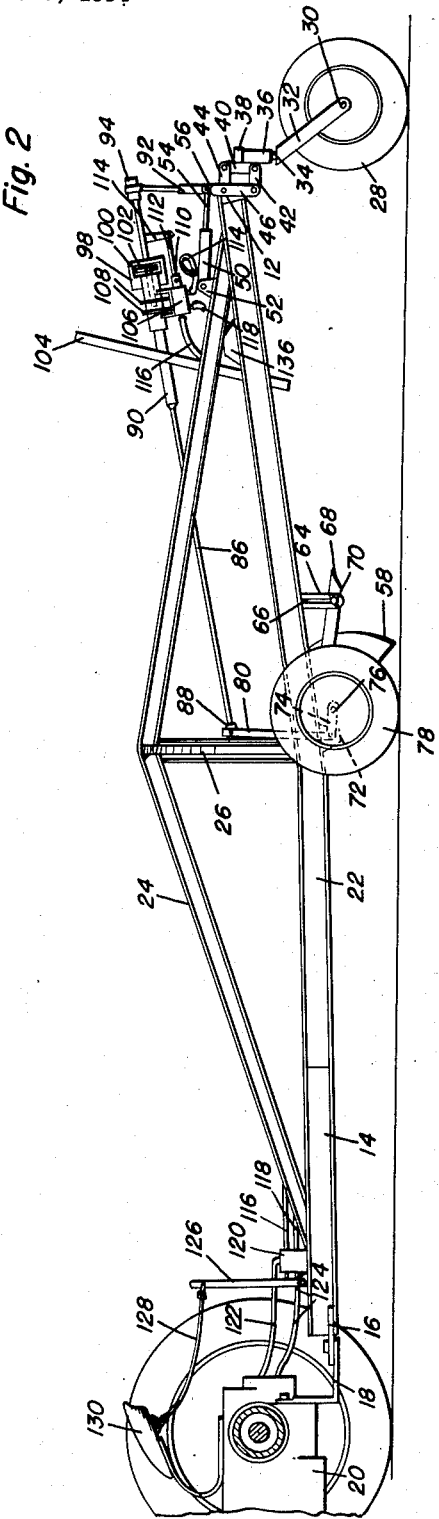
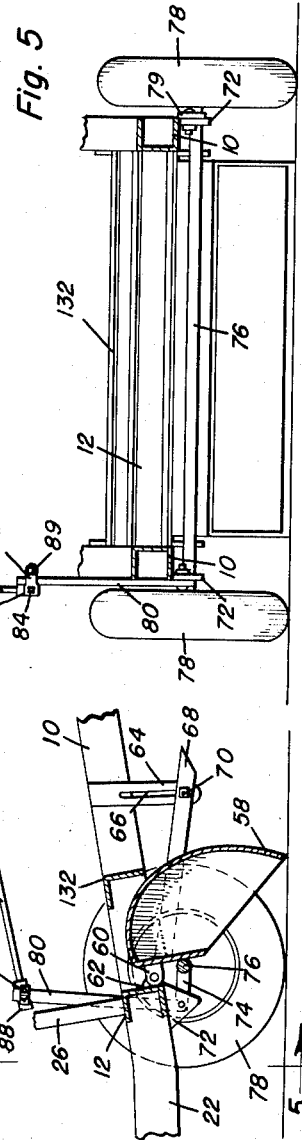
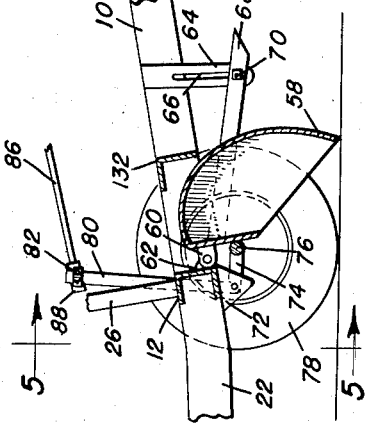
Lloyd T. Johnson
INVENTOR.
BY *Clarence A. O'Brien*
*and Harvey B. Jacobson*
Attorneys

2,787,066

HYDRAULICALLY OPERATED LAND LEVELER

Lloyd T. Johnson, Bellevue, Idaho

Application April 5, 1954, Serial No. 420,969

1 Claim. (Cl. 37—153)

This invention relates to a hydraulically operated land leveler and more particularly to a scraping leveler adapted to be drawn by a tractor, or the like, which will automatically adjust itself to contour land in a substantially level condition.

An object of this invention is to provide a hydraulically operated land leveler having ground engaging means which when effected by the contour of the land will cause an adjustment of the leveler whereby the scraper blade will follow a substantially level path.

Another object of this invention is to provide a hydraulically operated land leveler having novel means for raising and lowering the frame thereof to scrape land into a substantially level condition.

A further object of this invention is to provide an improved control valve assembly for a hydraulically operated land leveler which is responsive to variations in the contour of the land.

A still further object of this invention is to provide a hydraulically operated land leveler which is simple and efficient in construction, and durable and lasting in use.

These, together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1 is a top plan view of the land leveler forming the subject of this invention;

Figure 2 is a side elevational view of the land leveler forming the subject of this invention;

Figure 3 is a side elevational view with parts broken away of the land leveler forming the subject of this invention showing the ground engaging wheels in position in a depression in the surface of the ground over which the leveler is traveling;

Figure 4 is a sectional view taken substantially along the section line 4—4 of Figure 1; and Figure 5 is a sectional view taken substantially along the section line 5—5 of Figure 4.

Referring now more particularly to the accompanying drawings, it will be seen that the improved hydraulically operated land leveler forming the subject of this invention includes, a rectangular frame formed of a pair of parallel side members 10 which are joined together at their opposite ends by a pair of parallel end frame members 12. Secured to the central portion of the front end frame member 12 and extending forwardly therefrom at a slight angle relative to the horizontal plane of the side frame members 10 is a hitch bar 14. The hitch bar 14 has an ear 16 extending forwardly from the front end thereof which is adapted to be connected to the tow bar 18 of a conventional tractor 20.

Suitable braces 22 are connected to the juncture of the side frame members 10 with the front end frame member 12 and extend forwardly therefrom in converging relationship and are secured on opposite sides of the hitch bar 14. An inverted V-shaped brace member 24 is connected at its forward end to the hitch bar 14 adjacent its forward end and at its rear end to the rear end frame member 12. The apex of the U-shaped brace member 24 is positioned substantially directly above the front end frame member 12. Suitable braces 26 extend upwardly from the juncture of the side frame members 10 with the front end frame member 12 in converging relationship and are joined to the brace member 24 adjacent its apex. Thus, it will be seen that a substantially rigid frame is provided by use of the various bracings and frame members.

The rear of the frame is adapted to be supported by a pair of wheels 28. Each of the wheels 28 is rotatably mounted on a shaft 30 which is supported by a yoke 32 extending substantially vertically upwardly therefrom. The upper end of the yoke 32 is provided with a substantially vertically extending shaft portion 34 which has rotatably mounted thereon a collar 36. The upper end of the shaft 34 is provided with a fixed collar 38 which prevents the shaft 34 from becoming separated from the collar 36. Fixedly secured to the collar 36 and extending substantially parallel therewith is a first link 40. A pair of parallel links 42 and 44 are pivotally connected at opposite ends of the link 40. The free end of the link 42 is pivotally connected to a link 46 which is rigidly secured on the frame in substantial vertical position. One of the links 46 is provided at each end of the rear end frame member 12 and the link 42 is connected to the lower end thereof. A suitable shaft 48 is rotatably mounted on the upper ends of the links 46 and extend substantially parallel to the rear end frame member 12. The link 44 is fixedly secured to the end of the shaft 48. Thus, it will be seen that when the shaft 48 is rotated, the link 40 will be moved vertically with respect to the end frame member 12.

In order to provide means for raising and lowering the wheels 28 a suitable hydraulic cylinder 50 is pivotally connected at one end to a pair of ears 52 which extend upwardly from the brace 24 adjacent its rear end. The cylinder 50 is provided with a piston rod 54 extending therefrom which has its free end pivotally connected to a pair of ears 56 extending upwardly from the shaft 48. Thus, it will be seen that when the piston rod 54 is extended from the cylinder 50, the wheels 28 will be lowered with respect to the frame and when the piston rod 54 is drawn into the cylinder 50, the wheels 28 will be raised with respect to the frame. A scraper blade 58 is provided for attachment to the forwardmost frame member 12. The scraper blade 58 is preferably scoop shaped and is provided with a pair of ears 60 extending forwardly therefrom at opposite ends thereof. The front frame member 12 is provided with a pair of ears 62 extending rearwardly therefrom to which the ears 60 are pivotally attached.

The side frame members 10 are provided with downwardly extending arms 64 rigidly secured thereto. The arms 64 are provided with vertical longitudinally extending slots 66. Secured to the scoop 58 is a rearwardly extending arm 68. A suitable fastener 70 extends through an aperture in the arm 68 and through the slot 66 whereby the position of the scraper blade 58 can be adjusted with respect to the frame.

In order to provide an automatic means for raising and lowering the frame to position the scraper blade 58 above the surface of the ground over which the leveler is traveling, pairs of ears 72 are secured to the front frame member 12 and extend downwardly therefrom at opposite ends thereof. A pair of levers 74 are pivotally secured at one end to the pairs of ears 72 and the levers 74 support a shaft 76 at their other end.

A pair of ground engaging wheels 78 are mounted at opposite ends of the shaft 76. One of the levers 74 is provided with an extension arm 80 extending perpendicular thereto. The extension 80 extends in a substantially vertical direction. A split ring collar 82 is secured to the upper end of the extension 80 by a suitable fastener 84. One end of a shaft 86 is pivotally mounted to the collar 82 by means of a conventional bracket 88. The other end of the shaft 86 is provided with a tubular extension 90 which forms a longitudinal extension thereon.

The shaft 48 is provided with an arm 92 rigidly secured thereto and extending perpendicularly therefrom. A collar 94 is pivotally secured to the upper end of the arm 92 and is provided with a rod 96 rigidly secured thereto. The rod 96 is telescopically received in the tubular extension 90 of the shaft 86.

In order to provide a means for limiting the movement of the rod 96 with respect to the tubular extension 90, the tubular extension 90 is provided with an enlarged portion 98 at the free end thereof. A slot 100 is formed in the enlarged portion 98 and a collar 102 is disposed therein and is fixedly mounted on the rod 96. Thus, it will be seen that the collar 102 is capable of movement only within the confines of the slot 100.

A brace 104 formed of a substantially U-shaped member disposed at its upper end is mounted on one of the side frame members 10 and extends vertically upwardly therefrom. The shaft 86 is adapted to pass between the legs of the brace member 104 whereby side sway of the shaft 86 will be prevented.

A control valve 106 is secured to the tubular extension 90 by suitable fasteners 108. The valve 106 is provided with a plunger 110 extending therefrom and to which is connected a link 112. The link 112 is connected at its other end to an arm 114 which is rigidly connected to the rod 96 and extends perpendicularly therefrom. Thus, it will be seen that movement of the extension 80 toward the arm 92 will cause the rod 96 to telescope within the hollow portion 90 and will cause the plunger 110 to be moved inwardly within the valve 106. Movement of the extension 80 in the opposite direction with respect to the arm 92 will cause the plunger 110 to move outwardly from the valve 106. A conduit 114 is connected at one end to the cylinder 50 and at its other end to the valve 106. Suitable conduits 116 and 118 extend from the valve 106 and run along the brace member 24 to a suitable connector 120. The connector 120 is connected in any suitable manner such as by conduits 122 and 124 to a source of hydraulic pressure on the tractor 20. The connector 120 is also in the form of a valve having a lever 126 for controlling the actuation thereof. This lever 126 serves as an emergency lever for raising the frame 10 above the ground when the scraper blade 58 is overloaded.

In practical use of this device, after the lines 122 and 124 have been connected to the connector 120 and the collar 102 adjusted in a neutral position within the slot 100 as the leveler is towed across the ground, the scraper blade 58 will remove obstructions therefrom. In the event that there is a depression in the surface of the ground, as shown in Figure 3, the wheels 78 will be free to drop therein. This will cause the extension 80 to assume the position shown in Figure 3 and will cause the rod 96 to be moved within the tubular extension 90. This will cause the plunger 110 to move inwardly in the valve 106 and direct fluid from the valve 106 to the cylinder 50. This will extend the piston rod 54 causing the wheels 28 to be moved downwardly with respect to the frame. As soon as the arm 92 becomes parallel to the extension 80 the valve plunger 110 will then be in neutral position again stopping the flow of fluid to the cylinder 50.

When the wheel passes from the depression, the extension 80 will then be moved forwardly and out of alignment with respect to the arm 92 causing the plunger 110 to be moved to a position whereby the fluid from the cylinder 50 will be exhausted through line 114 and through the exhaust line 118 back to the tractor. This will cause the piston rod 54 to be withdrawn into the cylinder 50 causing the wheel 28 to be raised with respect to the frame.

Thus, it will be obvious that when the wheel 78 drops into a depression, the frame 10 will be elevated causing the scraper blade 58 to be raised above the ground and causing any material collected therein to be deposited in the depression behind the wheels. In the event that the wheels 78 pass over an elevated portion of the ground, the movement of the wheel in the opposite direction will cause the scraper blade 58 to dig deeper into the elevated portion. Thus, it will be obvious that the scraper blade 58 follows a substantially level plane during movement over the surface of the ground.

If desired, a suitable control cable 128 can be connected to the lever 126 and to the seat 130 of the tractor. This will provide a convenient means whereby the operator can actuate the handle 126 in the event that the scraper blade 58 is overloaded.

If desired, additional brace means 132 can be provided for the forward end of the rectangular frame and a brace member 134 can be provided adjacent the rear end of the rectangular frame for bracing the rear end of the brace 24. The brace 134 will preferably be raised above the side frame members 10 by means of a pair of brackets 136.

From the foregoing, the construction and operation of the device will be readily understood and further explanation is believed to be unnecessary. However, since numerous modifications and changes will readily occur to those skilled in the art, it is not desired to limit the invention to the exact construction shown and described, and accordingly all suitable modifications and equivalents may be resorted to, falling within the scope of the appended claim.

What is claimed as new is as follows:

A ground leveler comprising a frame having front and rear ends, and a scraper thereon, a pair of front wheels for supporting the front end of the frame, a pair of rear wheels for supporting the rear end of the frame, means pivotally mounting said front wheels on said frame for lowering relative to the frame, parallel link means pivotally mounting the rear wheels on the rear end of the frame and vertically swingable to lower said rear wheels relative to said frame for raising said rear end, hydraulic means on said frame for swinging said link means to lower said rear wheels, operating connections between said hydraulic means and link means, a valve on said frame operative from closed to open position to cause said hydraulic means to swing said link means, telescopic means separate from said hydraulic means operative to open and close said valve, means operatively connecting said first named means to said telescopic means to operate the latter to open said valve in response to lowering of the front wheels, and means operatively connecting said link means to said telescopic means for operating the latter to close said valve in response to lowering said rear wheels.

References Cited in the file of this patent
UNITED STATES PATENTS

| | | |
|---|---|---|
| 1,107,460 | Steele | Aug. 18, 1914 |
| 1,759,982 | Hauser | May 27, 1930 |
| 2,244,829 | Dick | June 10, 1940 |
| 2,283,744 | Lethlean | May 19, 1942 |
| 2,635,888 | Bailiff | Apr. 21, 1953 |
| 2,659,166 | Mathias | Nov. 17, 1953 |